Jan. 12, 1937.  H. T. HUNTER  2,067,849
DOUGHNUT MACHINE
Filed Jan. 26, 1934  10 Sheets-Sheet 1
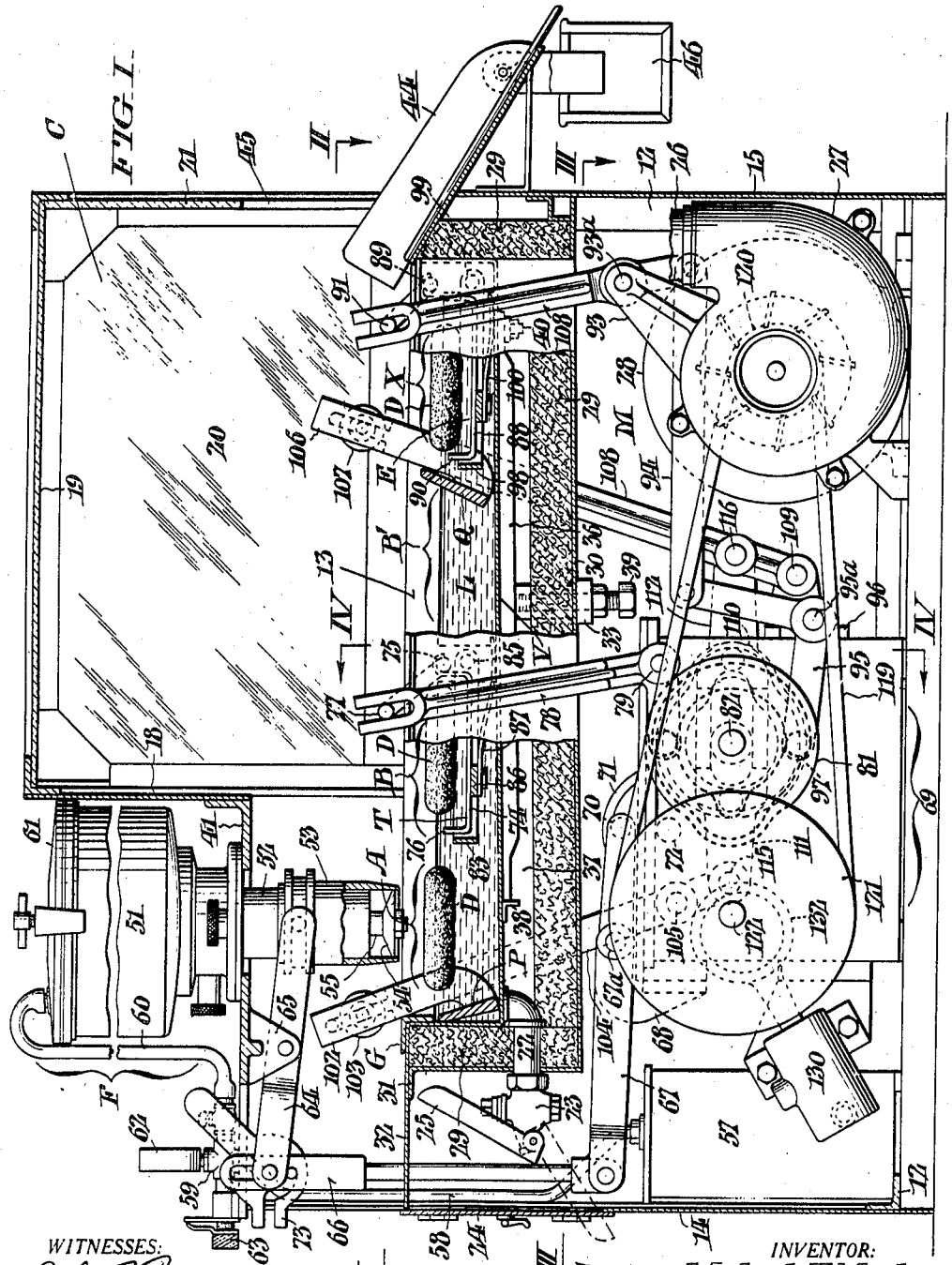
WITNESSES:  INVENTOR:
Herbert T. Hunter;
BY
ATTORNEYS.

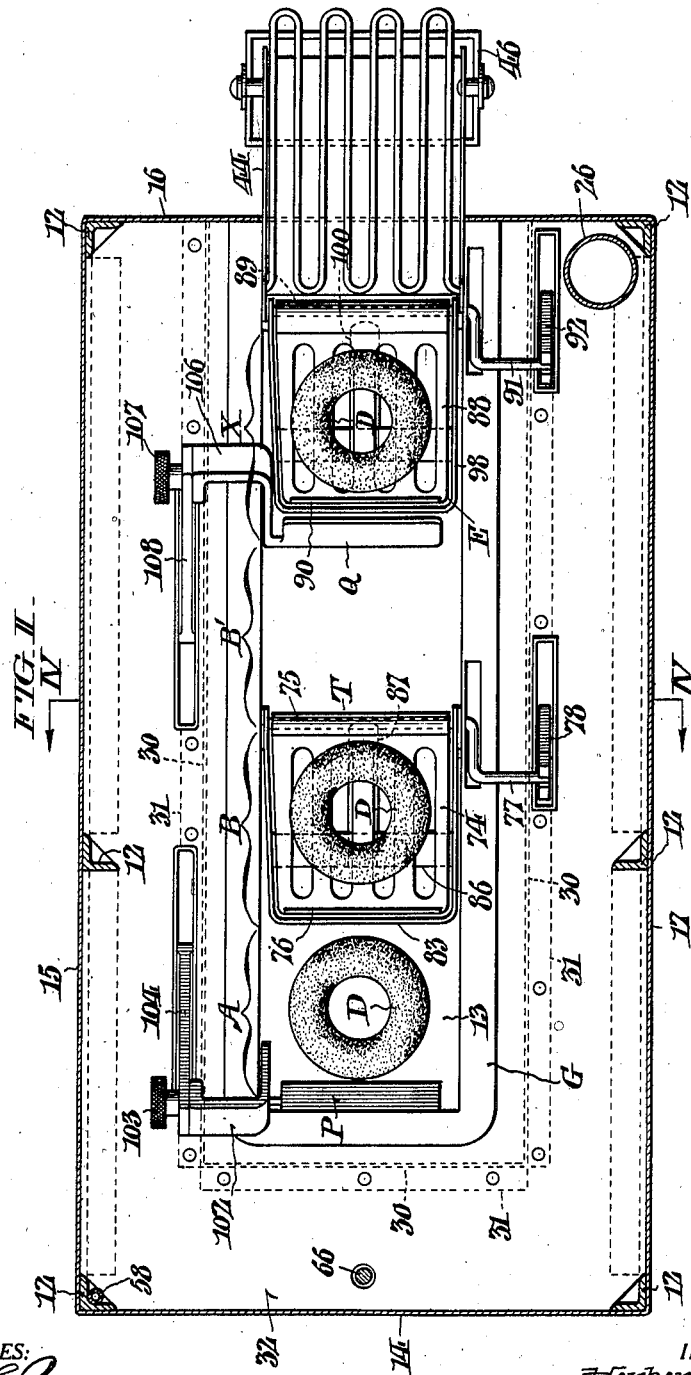

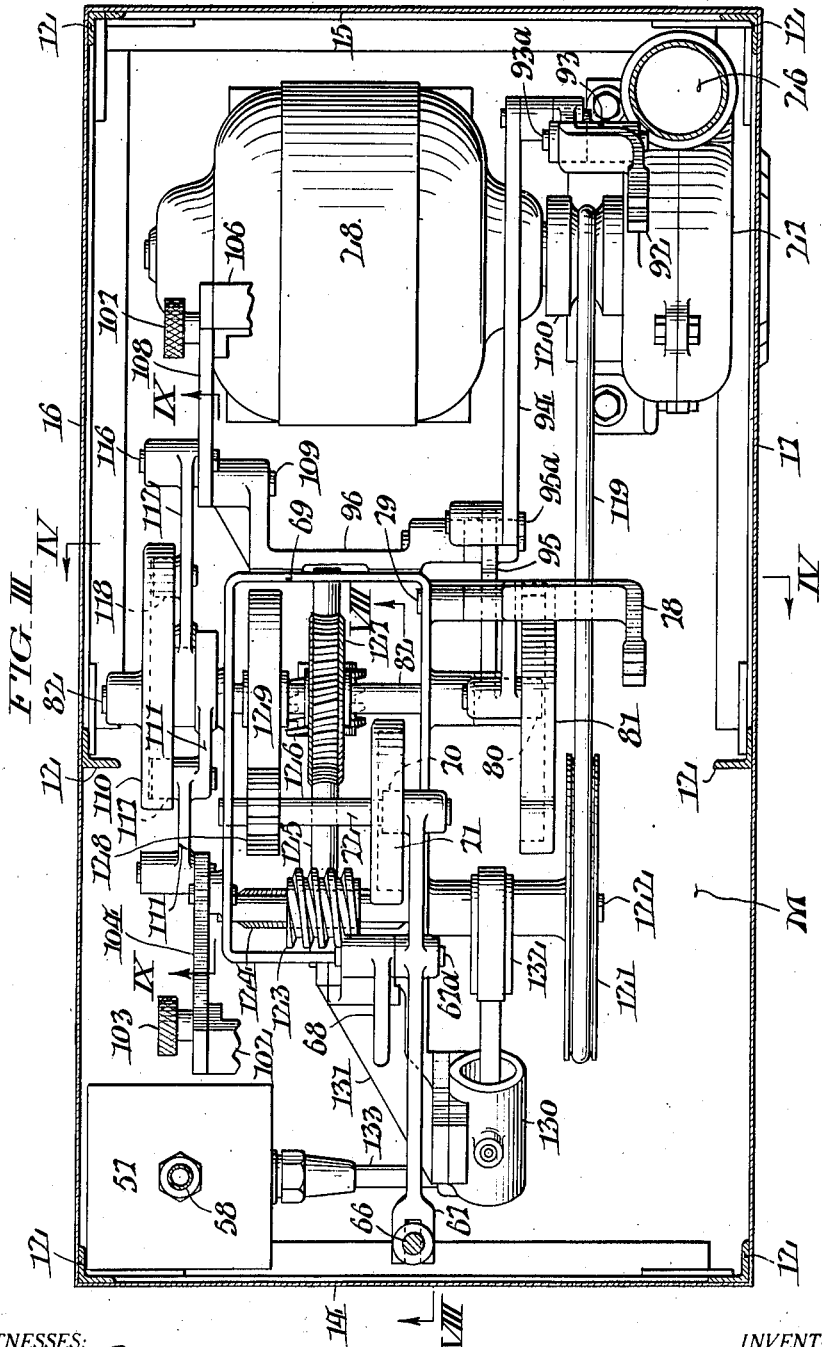

Jan. 12, 1937.  H. T. HUNTER  2,067,849
DOUGHNUT MACHINE
Filed Jan. 26, 1934  10 Sheets-Sheet 4
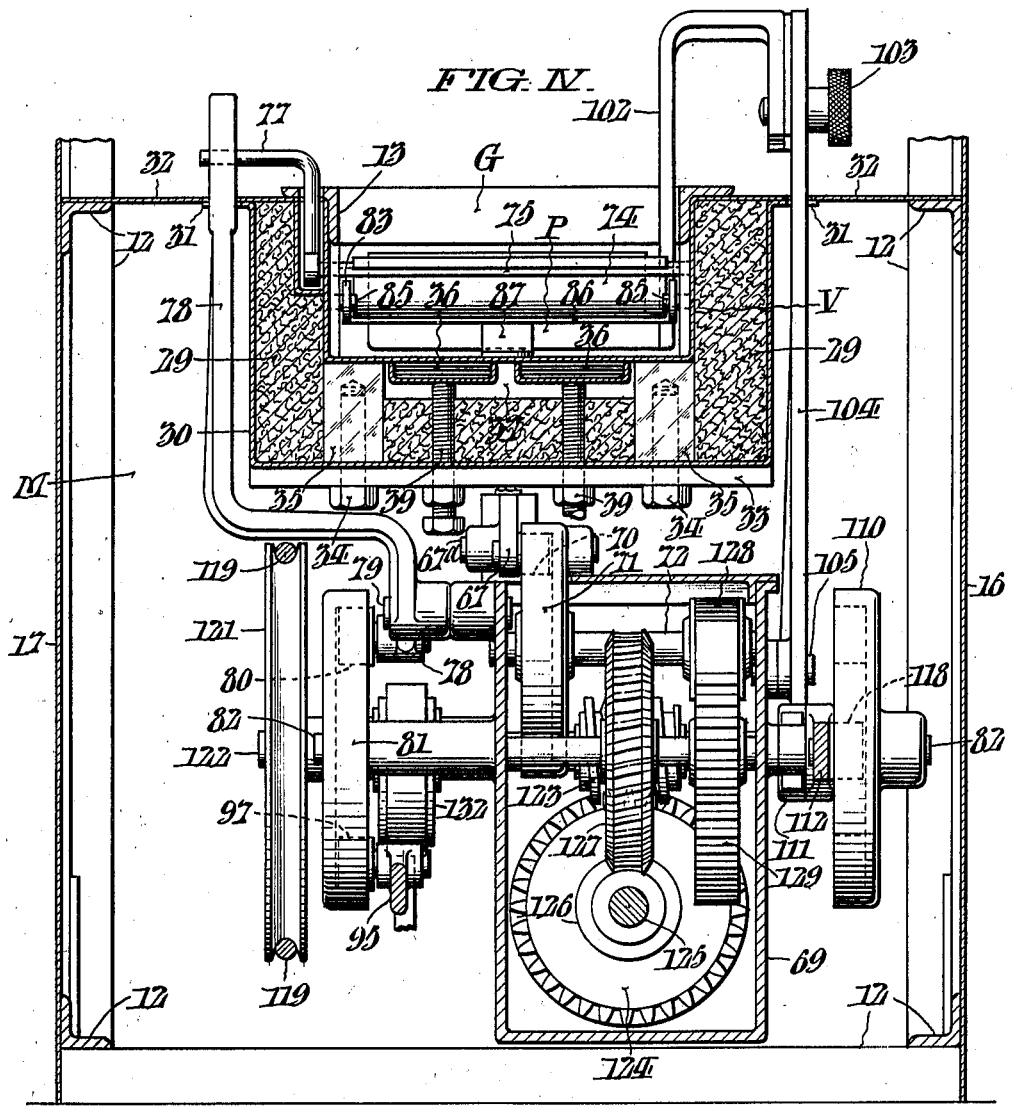
FIG. IV.
WITNESSES:
John C. Bergner
Thomas W. Kerr, Jr.
INVENTOR:
Herbert T. Hunter,
BY
ATTORNEYS.

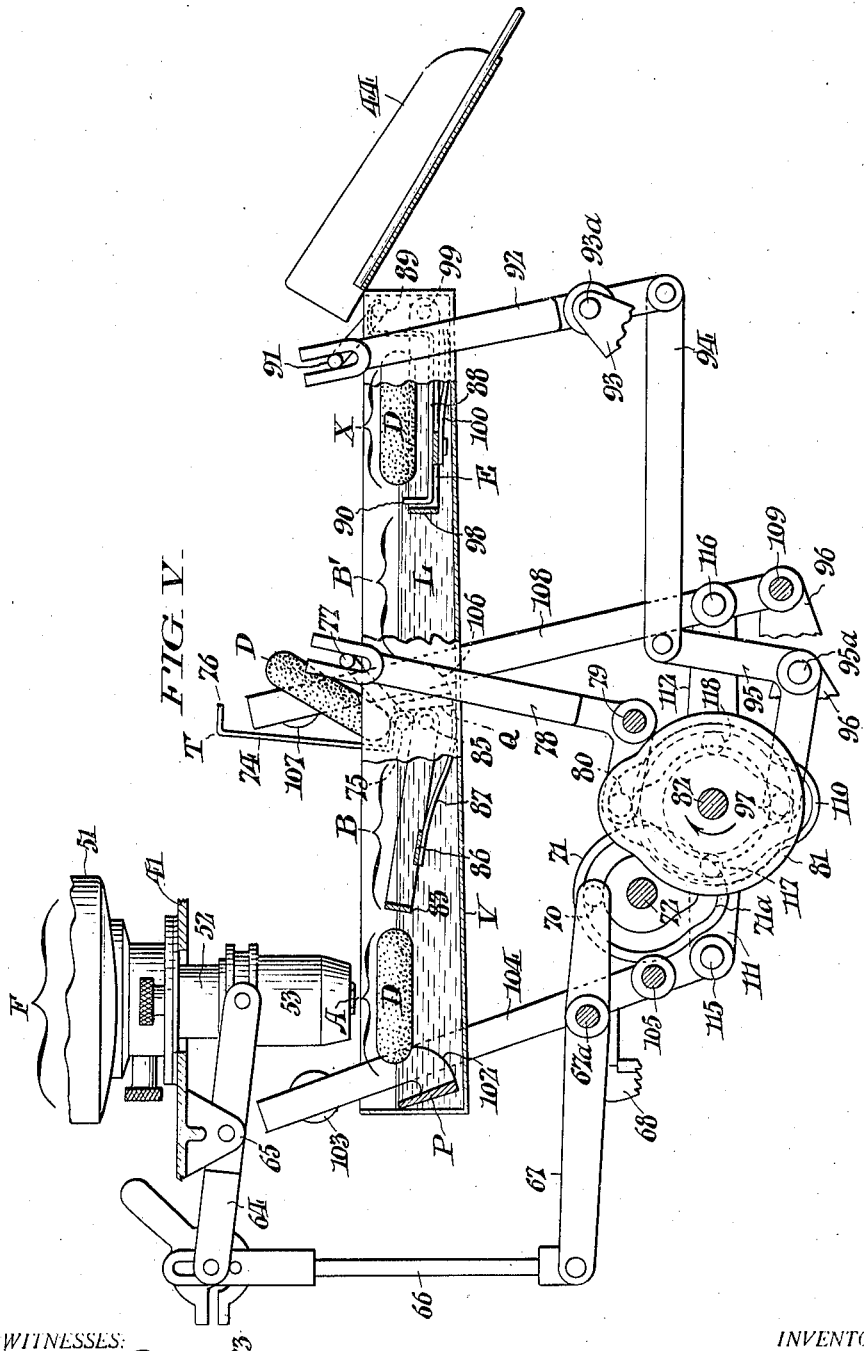

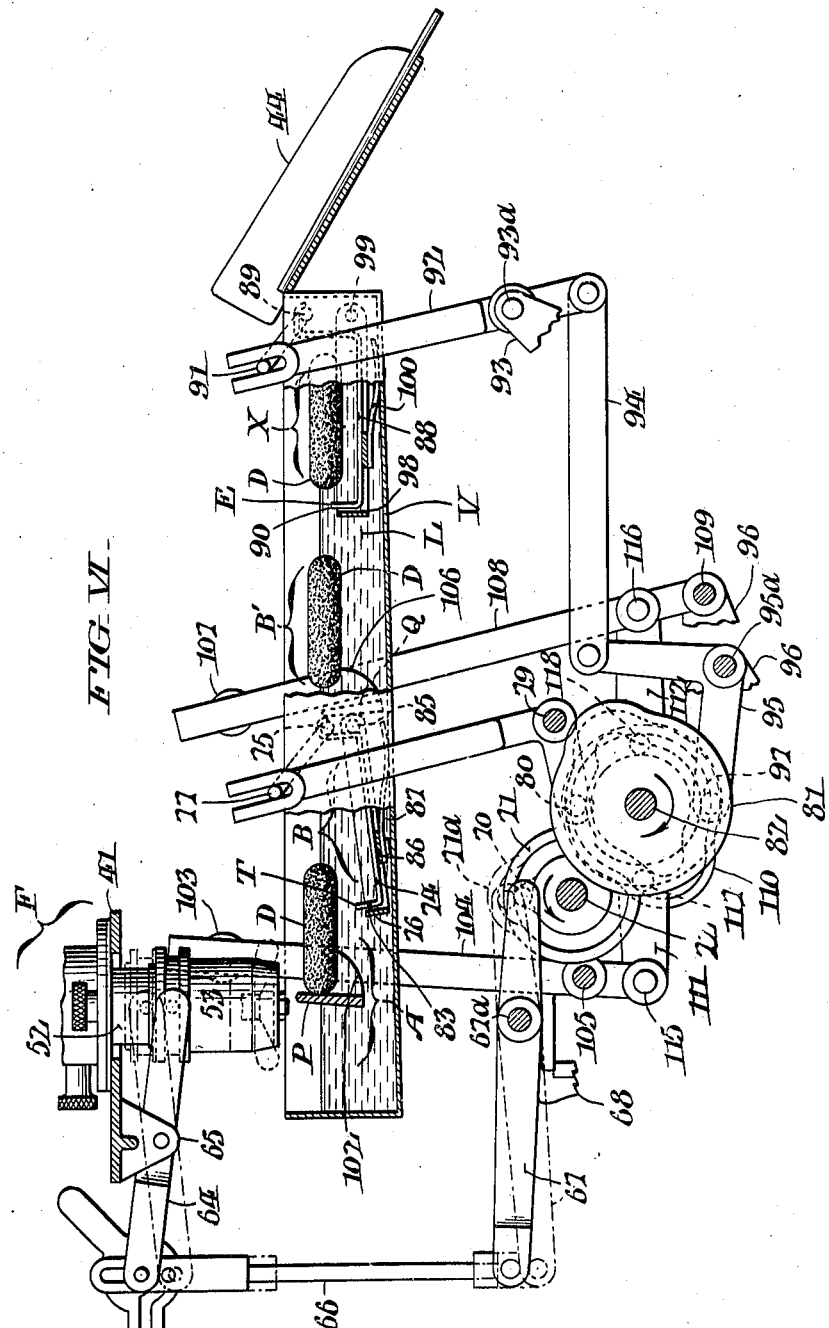

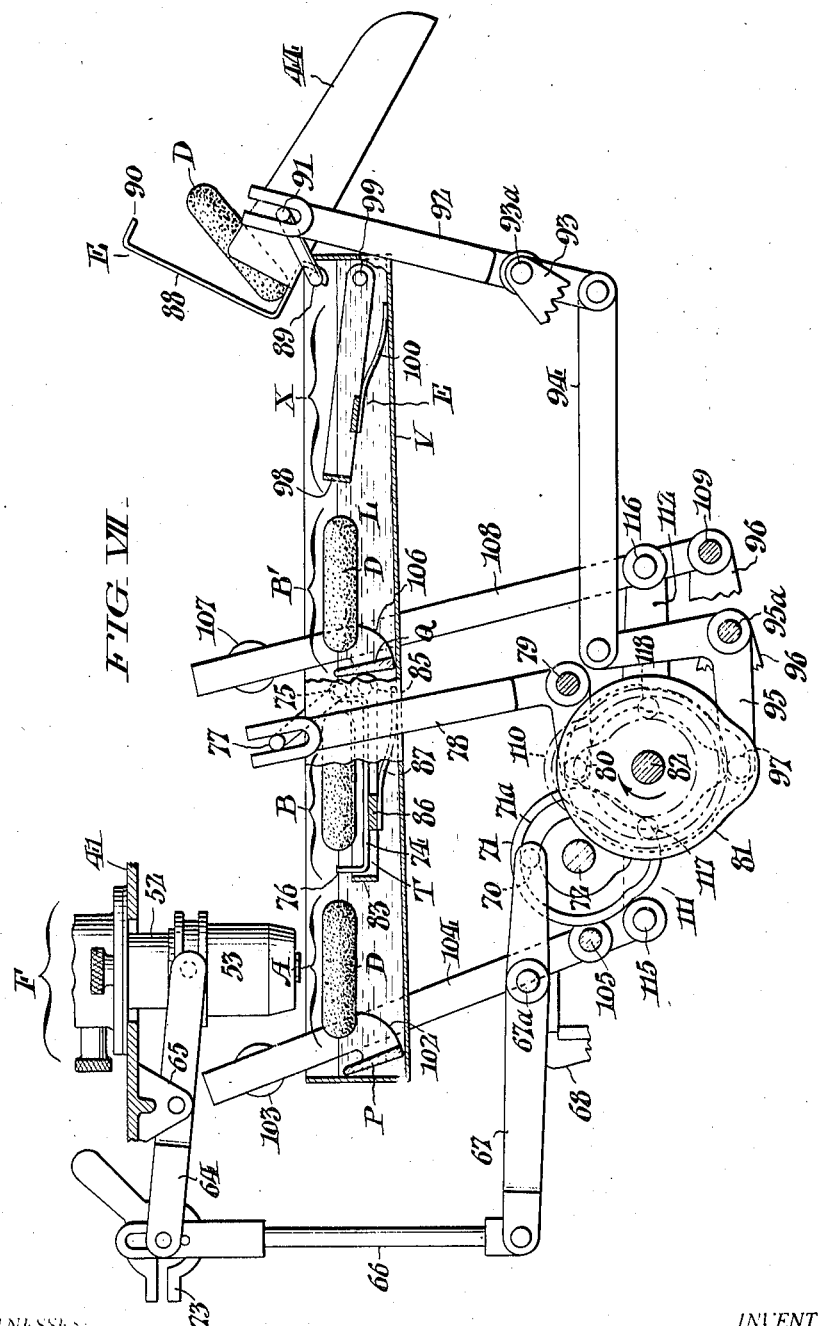

Jan. 12, 1937.       H. T. HUNTER       2,067,849
DOUGHNUT MACHINE
Filed Jan. 26, 1934      10 Sheets-Sheet 8
FIG. VIII.
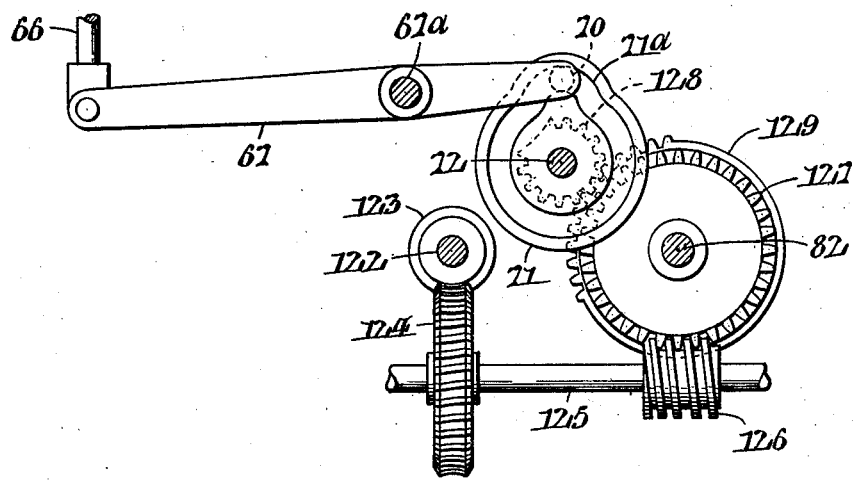
FIG. IX.
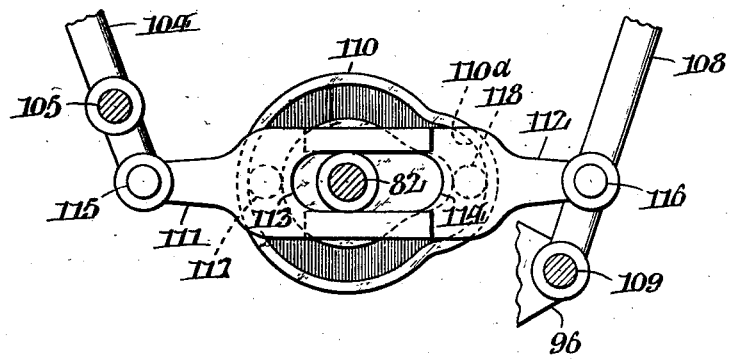
FIG. X.
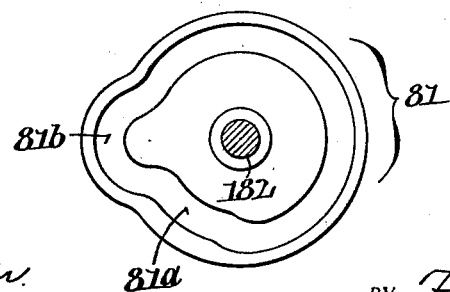
INVENTOR:
Herbert T. Hunter Jan. 12, 1937. H. T. HUNTER 2,067,849
DOUGHNUT MACHINE
Filed Jan. 26, 1934 10 Sheets-Sheet 9
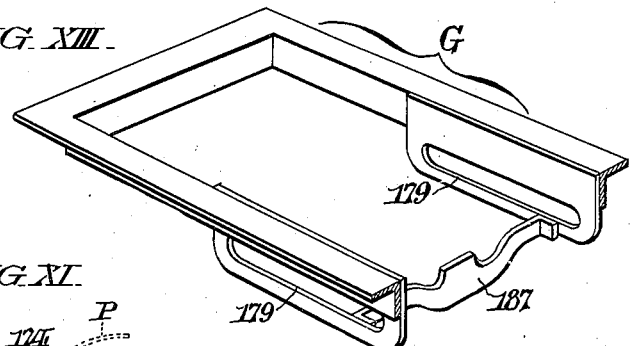
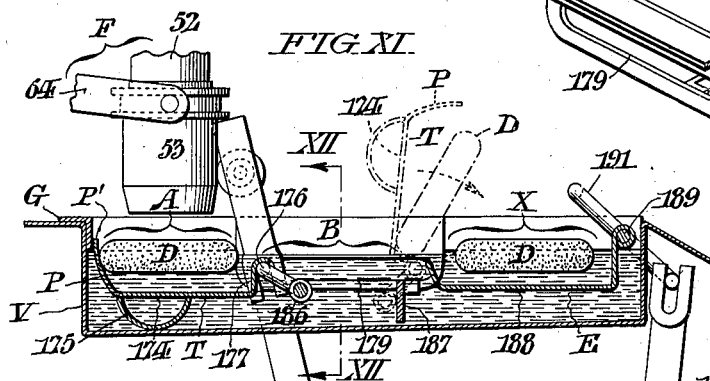
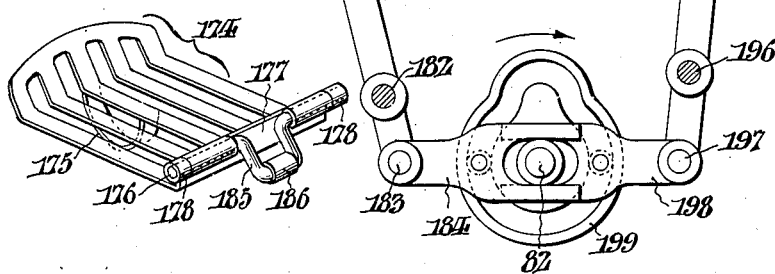
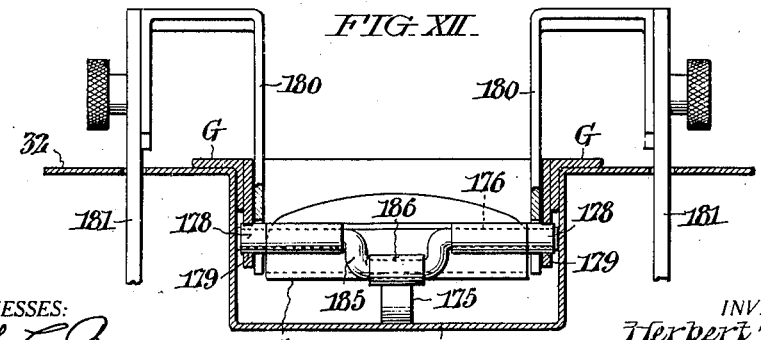
WITNESSES:
John C. Bergner
Thomas W. Kerr, Jr.
INVENTOR:
Herbert T. Hunter,
BY Fraley Paul
ATTORNEYS.

Jan. 12, 1937.  H. T. HUNTER  2,067,849
DOUGHNUT MACHINE
Filed Jan. 26, 1934   10 Sheets-Sheet 10
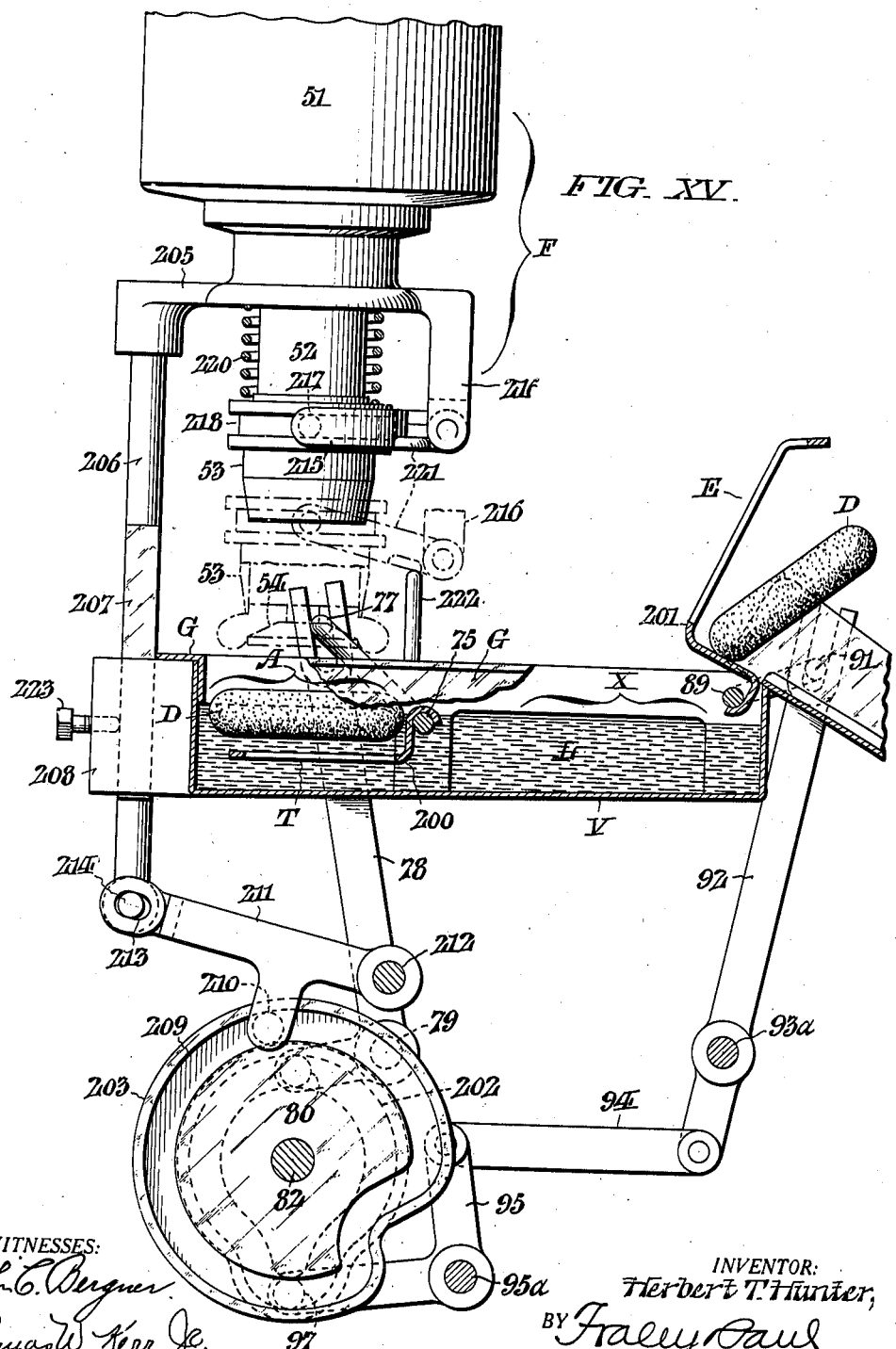
FIG. XV.
WITNESSES:
John C. Bergner
Thomas W. Kerr, Jr.
INVENTOR:
Herbert T. Hunter,
BY Foley Paul
ATTORNEYS.

Patented Jan. 12, 1937

2,067,849

UNITED STATES PATENT OFFICE 2,067,849

DOUGHNUT MACHINE

Herbert T. Hunter, Baltimore, Md., assignor to Doughnut Corporation of America, New York, N. Y., a corporation of New York Application January 26, 1934, Serial No. 708,393

30 Claims. (Cl. 53—7)

This invention relates to the production of doughnuts and the like, and to a novel machine that is especially adaptable and advantageous for producing doughnuts on a small scale. In suitable forms of embodiment, such as here shown and described, the invention affords a simple, compact, automatic machine, well adapted for display on store counters or in shop windows, requiring but a minimum depth of cooking vessel and a minimum amount of cooking "liquor" or grease, and using such small amounts of power as to be economically operable by current from the usual 110 volt lighting circuit, and even from an ordinary electric lamp socket. Such a machine is comparatively foolproof, and will operate continuously (with very little supervision) to turn out uniformly cooked doughnuts, evenly browned all over. Other features and advantages of the invention will appear from the following description of species thereof, and from the drawings, whence it will also appear that some of the features and combinations described are of more general utility, in doughnut machines of various types. This application is a continuation in part of my application Serial No. 655,553, filed February 7, 1933.

In the drawings, Fig. I shows a longitudinal section of a doughnut machine conveniently embodying the invention.

Fig. II is a plan section of the machine, taken as indicated by the line and arrows II—II in Fig. I.

Fig. III is likewise a plan sectional view of the machine, taken at a lower level as indicated by the line and arrows III—III in Fig. I.

Fig. IV is a transverse sectional view, taken as indicated by the line and arrows IV—IV in Figs. I, II, and III.

Figs. V, VI, and VII are simplified views corresponding to Fig. I, but showing only the essential parts and illustrating the successive steps in the operative cycle of the machine.

Fig. VIII is a longitudinal sectional view, taken as indicated by the line and arrows VIII—VIII in Fig. III, of the transmission from which all the actuated parts of the machine derive their motion.

Fig. IX is a fragmentary detail sectional view taken as indicated by the line and arrows IX—IX in Fig. III, showing cam means for actuating elements by which the doughnuts are manipulated and shifted in the machine at stages of the cooking period.

Fig. X is a detail view of another rotary cam embodied in the actuating mechanism.

Fig. XI is a somewhat fragmentary and diagrammatic longitudinal sectional view of a different form of machine, corresponding in a general way to Fig. I.

Fig. XII is a fragmentary transverse sectional view taken as indicated by the line and arrows XII—XII in Fig. XI.

Fig. XIII is a fragmentary perspective view of a frame shown in Figs. XI and XII, for mounting and guiding some of the moving parts.

Fig. XIV is a perspective view of a doughnut manipulating device shown in Figs. XI and XII.

Fig. XV is a fragmentary and diagrammatic longitudinal sectional view of still another form of machine.

The several types or species of doughnut machine here shown may be rather alike in general arrangement, construction, and operation; so that it will be of advantage to first explain briefly the principal features of the machine illustrated in Figs. I–X which are also present in the machines illustrated in Figs. XI–XIV and XV. The most striking common feature is, perhaps, a couple of cooking cells with means T, E for holding or confining each doughnut D, and manipulating it. In this machine each cooking cell comprises substantially half the length of the total cooking range in the apparatus. Each doughnut undergoes more or less cooking in the first cell, is inverted and passed along into the second cell, and is thence ejected after further cooking. The machine has a receptacle or vessel V for the cooking liquor or grease L, with a fixed straight cooking range or channel for the doughnuts D that is virtually defined by a frame G removably mounted in the vessel V, as well as by the walls of the trough-like vessel. The cooking range or guideway at G is about one doughnut wide, and affords a confined area or space sufficient for several doughnuts only: i. e., a row of four in Figs. I and II, two in each cell. In the cell in one end of the cooking range, raw doughnut formations D are suitably deposited and received, at a space D at station A, and cooked underneath. Thereupon they are inverted and transferred into the cell in the other end of the cooking range, where they are cooked on the other side; and when thus fully cooked, they are ejected at or from the space or station X.

The raw doughnuts D may be deposited at the receiving station A, horizontal, by any suitable means or forming device F directly over the station A; at the ejection station X, the doughnuts are confined, manipulated, and ejected by means of an ejector cellule device E which raises them from the liquor and throws them aside over this end of the guideway and of the vessel V. In the receiving end of the cooking range, the doughnuts D are confined, manipulated, and inverted, so as to be cooked and browned alike on both sides, by a turnover cellule device T. Turnover T and ejector E may be mounted on frame G, so as to be readily removed from the vessel V with the frame. As shown, the normally horizontal portions of turnover T and ejector E that engage the doughnuts D to turn them are generally submerged deep enough in the liquor L to allow the doughnuts to float free above them.

Rather than shift the former F out of the way, or locate it high enough above the liquor L to clear the doughnuts D or the manipulating means T in its movement above the liquor, it is preferable to locate the former F close above the liquor and manipulate or invert the doughnuts D directly adjacent the former, shifting the doughnuts edgewise from station A under the former toward the ejection end of the vessel V before thus inverting them,—as is done in the types of machine shown in Figs. I and XI. These horizontal positions and movements of each doughnut are preferably definitely controlled throughout: e. g., when first dropped it is received and kept confined at station A until it has cooked enough to become buoyant; it is then displaced or shifted to a position directly adjacent, where it may be held confined a while for further cooking (mainly on its under side); it is then thrown over into inverted position adjacent the position to which it is shifted as aforesaid; and it is thereupon received and confined in the ejection end of the cooking range until fully cooked, and then ejected up and aside, in the same direction, from station X.

In the machine of Figs. I-X, the vessel V has a cooking range affording room for four doughnuts in a row: two in the cell at the receiving end of the vessel, one at the station A directly under the former F, and one at the adjacent station B, in or on the turnover device T when inactive; and two in the cell at the ejection end of the vessel, one at the station B' where it is placed or thrown by turnover T when operated, and one at the adjacent station X, in or on the ejector device E when inactive. For manipulating and transferring the doughnuts D, there are shown, besides the turnover T, two progressing devices P and Q of pusher type: one P for coacting with the turnover T in receiving, confining, and controlling each deposited doughnut D between them (Fig. I), and afterward shifting it to the right, from under the former F into the turnover cell T (Fig. VI), where it can be confined and afterward inverted and thrown over further to the right by the turnover (Fig. V); and the other Q for coacting with the ejector E in receiving, confining, and controlling the thus inverted doughnut D between them (Fig. V), and afterward shifting it still further to the right (Fig. I) into the ejector cell E, where it can be confined and afterward thrown up and out of the vessel V by the ejector (Fig. VII). In this machine, the space at A in advance of turnover cellule T at B facilitates inversion without interference from the former F, as already explained, and the space at B' between cellule T and ejector cellule E at X coacts with spaces A, B, X to increase the capacity of the machine; because the required cooking time for one side of a doughnut may be divided between stations A and B, and that for its other side between stations B' and X. With ordinary doughnut batter, such a machine has a capacity of about two doughnuts a minute.

Practically speaking, the first or doughnut-receiving cell is defined by the left-hand end of receptacle V and frame G (Figs. I, II, and VI-VII) and the right-hand wall 76 of cellule T embodying axis 75; and the second or ejection cell is defined by this same wall of cellule T and by the right-hand end of receptacle V and frame G,—or, more properly speaking, perhaps, the wall of cellule T that is attached to shaft 89. Laterally, both of the cells are defined, of course, by the sides of receptacle V and frame G.

I will now describe the general construction and operation of the Figs. I-X machine in greater detail, and afterward the distinctive details of the Figs. XI-XIV and XV machines.

As shown in Figs. I-X, my doughnut machine comprises a frame 12 which, in the present instance, is constructed from angle iron, and of generally oblong rectangular configuration. Supported longitudinally within the frame 12, at about midheight of the latter, is a relatively shallow narrow elongated vessel or receptacle V fashioned from sheet metal and containing the cooking liquor (grease) L which is maintained at the level shown, by suitable means not illustrated, the width of said receptacle being such as to define a single straight-away channel wherein the doughnuts indicated at D are progressed from left to right while afloat in the liquor during the cooking period. The portion of the frame 12 below the cooking receptacle or trough V is closed in by sheet metal panels 14, 15, 16, and 17, which form a compartment M for the drive mechanism of the machine, while the upper portion of the frame is closed in at the front by a sheet metal panel 18 and at the top, sides and rear by transparent panels 19, 20 and 21 of glass to form a cooking chamber C over the after or right-hand part of the receptacle. The machine is thus well adapted for display purposes, since all the manipulations of the doughnuts during cooking may be readily observed from the exterior. The receptacle V is drainable through a pipe 22 at the left-hand end thereof, under the control of a wrench-operated valve 23. As shown, this valve 23 is accessible through a door protected opening 24 in the front end wall panel 14 of the machine, and is fitted with a hinged spout 25 capable of being swung downward and outward through said opening, as shown in dot-and-dash lines in Fig. I, when the receptacle 13 is to be drained. Fumes rising from the cooking liquor are drawn out of the compartment C through a vertical pipe 26 which extends downward and connects with a centrifugal suction blower 27 located in the lower compartment M and directly driven by an electric motor 28.

For the purposes of heat conservation, and also to protect the mechanism within the compartment M below the receptacle V, the latter is encased with relatively heavy thermo-insulation 29 which extends around the receptacle sides and across the bottom. As shown, this insulation is retained by a box-like sheathing 30 of sheet metal having a flange 31 around the top thereof to abut the underside of an outward perimetric flange 32 at the top of the receptacle V. The sheathing 30 is supported and held in place by an underslung cross bar 33 which is secured by screw bolts 34 that take into a pair of lug blocks 35 welded or otherwise secured in transverse spaced relation to the bottom of the receptacle V, substantially at the center.

For heating the cooking liquor L, I employ a pair of conventional electric strip heater units 36 which extend side by side lengthwise centrally of the bottom of the receptacle V, in an interspace 37 provided for them in or above the insulation. During assembling of the machine, the heating units 36 are slipped into the interspace 37 from one end of the latter until they abut an angle stop 38 secured crosswise of the bottom of the receptacle V near the left-hand end of the latter, and are afterward clamped tightly against the exposed portion of the receptacle bottom by means of screw bolts 39 passing up through the bar 33. Electric current is supplied, under control of a suitable thermostatic regulator for automatic maintenance of the cooking liquor L at a predetermined temperature, to terminals 40 at one end of the heater 36, see Fig. I. This thermostatic control forms no part of the present invention and has therefore been omitted from the drawings. The heating units 36 may be of any approved type capable of operating with a small amount of current at a voltage available from any ordinary electric light socket.

Detachably supported by a horizontal plate 41 above the receiving station or clear space A of the receptacle V at its left-hand end is an intermittently-operated forming device F, capable of successively releasing individual raw doughnuts to drop horizontally into the receptacle; and at the opposite end of the machine there is provided a delivery chute 44 for discharging the cooked doughnuts, after ejection, through a discharge opening 45 in the rear glass panel 21 of the cooking chamber C, to a receiving tray or basket, not illustrated. A removable trough 46 hung to the outer end of the chute 44 serves to catch the excess cooking fluid thrown off with the doughnuts during ejection.

The manipulating device T located at an intermediate point B in the receptacle V serves to turn over the individual doughnuts, after floating on one side in the liquor L during the initial stage of the cooking period, to float on the other side during the final stage of the cooking period. At the expiration of the cooking period, another manipulating device E lifts the doughnuts individually from the liquor at X and ejects them through the discharge opening 45 and onto the delivery chute 44. To advance the doughnuts individually from the clear space at A beneath the forming device F to the turnover device T there is provided a progressive member P. A similar progressing member Q serves to advance the turned doughnuts individually from a station or clear space at B' beyond the turnover device T to the ejecting device E. As later on explained, the turning, ejecting and advancing devices T, E, P, and Q just referred to are operated in timed relation such that a fully cooked doughnut is discharged from the machine for each raw doughnut introduced, the timing being, in this instance, such as to give a capacity of approximately two doughnuts per minute for the machine.

The illustrated forming device F is of a well known type, consisting of a cylindrical dough hopper 51 with a tubular discharge neck 52 at the bottom. Slidable up and down on the neck 52 of the dough hopper 51 is a cutter sleeve 53 having its lower edge sharpened to shear around a fixed cutter disk 54 which is supported by an axial stem 55 within said neck. When the sleeve 53 is raised as shown in dotted lines in Fig. VI, there is formed between it and the disk 54 an annular die opening through which the dough is expressed under pressure. Upon descent of the cutter sleeve 53 to the position shown in Fig. I, the extruded dough is severed, and released as a ring to drop horizontally, by gravity, into the receptacle V. The dough within the hopper is subject to the pressure of compressed air supplied from a tank 57 in one corner of the machinery compartment, through a pipe 58 which extends upward from said tank to a fitting 59 above the supporting plate 41. From this fitting 59, the compressed air is conducted to the dough hopper 51 through a flexible tube 60 which connects with a nipple on the removable lid 61 of said hopper. Interposed in the piping just described is a pressure gage 62 and a regulatable automatic bleed valve 63 capable of maintaining a predetermined pressure of the air. The sleeve 53 of the cutter die mechanism F is actuated by means including a lever 64 which is fulcrumed at the center to a depending ear 65 of the supporting plate 41 and connected by a vertical drop link 66 to another lever 67 within the compartment M. This second lever 67 is likewise fulcrumed intermediate its ends at 67a to a bracket 68 on the casing of a transmission 69 from which all the moving parts of the apparatus are actuated. At its free end, the lever 67 carries a roller 70 which engages a face groove in a rotary cam 71 affixed to a shaft 72 embodied in the transmission 69, said cam having a single rise at 71a, Fig. VIII. A swingable latch member indicated at 73 in Fig. I makes it possible to operatively disconnect the lever 64 from the link 66 for maintenance of the sleeve 53 in its down position to cover the annular die opening of the forming device F when desired or required, so as to render the doughnut former F inactive without stoppage of the driving mechanism of the machine.

The turnover device T comprises a hand 74 which is normally submerged horizontally in the cooking liquid and secured to a positionally fixed shaft 75. At its swinging end, the hand 74 has an upturned flange 76 which normally projects above the liquor to prevent the doughnuts from floating rearward after having once been advanced to the position B above said hand by the progressing member P. To the shaft 75 of the turnover hand 74 is secured, at one end, a crank 77 which extends outward over the top of the receptacle V at the side nearest the observer in Fig. I (to the left in Fig. IV) to engage the bifurcated upper end of a bell crank rocker arm 78. This arm 78 is fulcrumed on a stud projection 79 on the casing of the transmission 69, and on its horizontal extremity carries a roller 80 which engages in a face groove of a rotary cam 81 secured to a shaft 82 of said transmission, directly above said shaft 82. The cam 81, it will be noted from Fig. X, has a depression 81a and a rise 81b, so that during each revolution of the shaft 82, the hand 74 is first lowered to permit advance of a doughnut over it as shown in Fig. VI, and thereafter swung upward to the position shown in Fig. V so as to transfer the doughnut, inverted, to the station or clear space B'. Associated with the turnover hand 74 is a yoke-like stop member or bail 83 whose extremities are fulcrumed on positionally fixed studs 85, see Fig. IV. Across the bottom of the stop yoke 83 extends a bar 86 to which is secured a leaf spring 87. Concurrently with the upward swinging movement of the turnover hand 74, as shown in Fig. V, the spring 87 acts to raise the stop member 83, so as to prevent the doughnut in the receiving station or clear space A from accidentally floating into the way of the turnover T and being mutilated by the hand 74 during its back swing.

The ejector device E is generally similar to the turnover 74, comprising a hand 88 which is secured to a positionally fixed cross shaft 89, and formed at its free end with a stop flange 90. The shaft 89 of the ejector hand 88, it will be noted, is at a higher level than that of the turnover hand 74, so that by the upward swinging movement of said ejector hand the doughnut is raised to the level of the delivery chute 44 as shown in Fig. VII. The crank arm 91 of the ejector shaft 89 is engaged in the bifurcated upper end of a vertical rocker arm 92 which is fulcrumed on a stud 93a supported by a bracket 93 reaching angularly upward from the casing of the blower 27. The lower end of the lever 92 is coupled by means of a horizontal link 94 with one arm of a bell crank lever 95 fulcrumed at 95a on a bracket 96 at the right-hand end of the casing of the transmission 69. The other arm of this bell crank lever 95 carries a roller 97 which engages in the face groove of the cam 81, below the shaft 82 or at a point one hundred and eighty degrees from the roller 80 mentioned in connection with the turnover device T. The turnover and ejecting devices T and E are thus operated in exactly the same way, but in alternation. A yoke or bail-like stop member 98 similar to the one 83 previously described has its extremities fulcrumed on positionally fixed studs 99, and has attached to it a leaf spring 100, which, as the ejector hand 88 is swung upward, causes said stop member to be elevated to the position of Fig. VII to prevent doughnuts from floating accidentally from the clear space B' into the way of the ejector E while the hand 88 is raised, see Fig. VII. The axes 75 and 89 of the swinging turnover and ejector hands 74 and 88, as well as the pivot studs 85 and 99 for the stop members 83 and 98 respectively associated with said hands, are all supported by the angle iron frame G fitting the cooking receptacle V and having its lateral perimetric flange resting on the top of said receptacle, as shown in Figs. I, II, and IV. This construction not only facilitates assembling of the machine initially, but permits bodily removal of the turnover and ejector devices T and E for convenience of cleaning the receptacle V from time to time, the cranks 77 and 91 lifting readily upward out of the bifurcations of the rocker arms 78 and 92.

The progressing member P has the form of a pusher blade which extends transversely of the receptacle V, and which is formed at one end with an upward and outward angular extension 102. This extension 102 overreaches the receptacle V at the side remote from the observer in Fig. I (right of Fig. IV), and is adjustably secured by a thumb screw 103 to the upper end of a rocker arm 104 fulcrumed at 105 on the casing of the transmission 69. The progressing member Q is similar to the progressing member P in that it is a pusher blade formed with an upward and outward angular extension 106 which is adjustably secured by a thumb screw 107 to the upper end of a vertical rocker arm 108 also at the remote side of the machine in Fig. I, said rocker arm being fulcrumed at its lower end to the bracket 96 at 109. The progressing devices P and Q receive motion alternately and contrariwise from another rotary cam 110 on the shaft 82, through means including a pair of overlapping horizontally reciprocating members 111, 112, whereof the inner ends are bifurcated as at 113, 114 for sliding guidance by said shaft and the outer ends respectively connected pivotally to the levers 104, 108 at 115, 116, see Figs. I, III, and IX. Rollers 117, 118 on the reciprocating members 111 and 112 engage in the face groove of the cam 110, at diametrically-opposite points, said cam having, as shown in Fig. IX, but a single rise at 110a. Attention is directed to the fact that the cams 81 and 110 are set on the shaft 82 with their rises in opposed relation, from which it follows that the advancing devices P and Q are operated in alternation with each other as well as in alternation with the turnover and ejecting devices T and E.

The transmission 69 is driven at a reduced speed through a belt 119 connecting a small pulley 120 on the shaft of the motor 28 with a larger pulley 121 on the power shaft 122 of said transmission. Mounted on the shaft 122 within the casing of the transmission 69 is a worm 123 by which motion is communicated at further reduced speed to an intermeshing worm wheel 124 on a longitudinal shaft 125 of the transmission. The shaft 125 in turn carries a worm 126 by which motion is transmitted at still more reduced speed to a worm gear 127 on the main cam shaft 82 of the transmission. The shaft 72 carrying the cam 71 for actuating the doughnut forming device F is rotated intermittently through coaction of a mutilated pinion 128 thereon with a mutilated larger drive gear 129 on the constantly rotating main cam shaft 82 of the transmission. The ratio between the mutilated gears 128, 129 is such that a rapid movement is imparted to the cam shaft 72 once for each rotation of the main cam shaft 82 whereby, at the proper time, the cutting sleeve 53 of the forming device F is given a quick cutting motion to prevent the doughnuts from clinging to the die mechanism. A continuous supply of compressed air for the forming device F is maintained by means of a pump 130 which is supported by a bracket 131 secured to the left-hand end of the casing of the transmission 69 and operated by an eccentric 132 on the drive shaft 122 of the transmission, said pump being connected with the compressed air supply reservoir 57 by a pipe 133 (Figs. I and III).

Through setting of the various rotary cams embodied in the actuating mechanism as hereinbefore set forth, there is predetermined a cooking cycle in which a raw formation is released to drop into the receptacle V at the feed end A by the forming device F as shown in Fig. I; the turnover device T next actuated as shown in Fig. V to turn a doughnut previously shifted and placed thereover by the progressing means P, and to transfer it to the clear space B'; a raw doughnut next advanced to the turnover device T as shown in Fig. VI; and a cooked doughnut next discharged onto the delivery chute 44 as shown in Fig. VII. This sequence of operations in the cooking cycle makes possible the compact construction which characterizes my new machine, the timing of the steps being such as to insure thorough cooking of the doughnuts and even browning of their opposite sides. The machine is accordingly especially advantageous in retailing establishments where a small output is desired and where the machine can be used for display purposes on the shop counter or in the show window, to stimulate sale of the product.

In the somewhat simpler machine of Figs. XI–XIV, the cooking range affords room for only three doughnuts in a row. The station X and ejector cellule E are directly to the right of the turnover T when in inactive position at station B, without any intervening space, so as to receive each inverted doughnut D directly from the turnover T; and the progressing device Q of Figs. I and II is omitted. The progressing device P is combined with the confining and turnover cellule device T, as an upstanding lip P' thereon; and this turnover T is reciprocated or shifted back and forth in the cell at the receiving end of vessel V, between station A and station B. Thus turnover T receives each raw doughnut D at A as shown in full lines in Fig. XI, confines and holds it there till sufficiently cooked on its underside, when the turnover T is shifted to the right and swung up at B, as shown in dot-and-dash lines, to invert and transfer the doughnut D further to the right to X, in the cell at the ejection end of the vessel V,—where it is received and confined by the ejector E until fully cooked. On the return movement of turnover T to the left, it is swung down again. Thus this turnover cellule T reciprocates and also oscillates.

Such a machine has a capacity just about half that of the Figs. I-X machine, since cooking occurs, practically, only at stations A and X in Fig. XI, as against stations A, B, B', X in Fig. I, etc.

Here the first or doughnut-receiving cell in which the turnover device T reciprocates corresponds substantially to that of Figs. I and V-VII, being defined by the left-hand end of receptacle V and frame G and by the upstanding lip at the free edge of the ejector cellule E,—or the wall 177 of device T that is attached to shaft 176. The second or doughnut-ejection cell, however, is only half as large, virtually consisting of the ejector cellule E itself.

In the machine of Figs. XI-XIV, the hand 174 of the turnover T is a grid structure resembling the hand 74 of Figs. I-VII, but has (as already mentioned) a high upstanding flange or lip P' at its left-hand end, which combines the functions of the progressing device P with those of the turnover stop yoke 83 and the flange 76 in Figs. I-VII. On its bottom, the hand 174 has a curved stop and runner projection 175 which normally rests on the vessel bottom and supports the hand horizontal. A shaft 176 fixed to the upstanding right-hand flange 177 of the hand 174 has antifriction rollers 178 on its projecting ends, which engage in guide slots 179 in ears depending from the angle-bar frame G, and also engage in the forked ends of downward extensions 180 adjustable on the upper arms of a forked bell-crank lever 181,—which arms extend up through slots in the flange 32 of the vessel V at both sides of the latter. Like the lever 104 in Fig. I, etc., the forked bell-crank lever 181 has a fixed fulcrum at 182, and its lower arm is pivoted at 183 to a horizontally reciprocating member 184, similar to the member 111 in Fig. IX. An arm 185 on the hand 174 projects downward and to the right beyond the axis formed by the shaft 176, this arm 185 consisting of a crank offset of the shaft 176, and carrying an anti-friction roller 186 for engaging against a stop bar 187 extending across the frame G. When the arm portions 180 of the lever 181 move to the right from their full-line position in Fig. XI, the hand 174 is dragged along, with its runner sliding on the bottom of the vessel V, until the roller 186 on arm 185 strikes the stop 187; and thereupon the further movement of the shaft 176 with the arm portions 180 swings the hand 174 upward and to the right to the dot-and-dash position shown in Fig. XI, inverting the doughnut D in the hand 174 and throwing it over into the ejection station X, as indicated. When the arms 180 of lever 181 return to the left, the hand 174 first swings back (its runner 175 being made heavy enough to return it) to horizontal, and then returns horizontal to the full-line position of Fig. XI.

The hand 188 of the ejector E is shown substantially like the hand 174, though without its extremely high lip P', and is mounted, arranged, and operated on a shaft 189 substantially like the ejector hand 88 in Figs. I-VII, except for differences in the following particulars: i. e., the crank 191 of hand 188 extends up and outward over the side of the vessel V and then downward and to the right below the shaft axis 189 about which the hand 188 swings. There the crank 191 engages in the forked upper end of a bell-crank lever 195 having a fixed fulcrum at 196, and having its lower arm pivoted at 197 to a horizontally reciprocating member 198 similar to the member 112 in Fig. IX. The members 184 and 198 are actuated by a cam 199 on the shaft 82, this cam 199 being essentially similar to the cam 110 in Fig. IX. The cam 81 of Fig. X is dispensed with; and the cutter F in Fig. XI is operated like that in Figs. I-VII.

In Figs. XI-XIV, various parts and features like those in Figs. I-X (not herein particularly referred to) are marked with the same reference characters, as a means of dispensing with repetitive description.

In the still simpler machine of Fig. XV, the cooking range affords room for only two doughnuts, one confined or held in or on the turnover device T at station A directly under former F, and the other confined or held in or on the ejector device E at station X, directly to the right of turnover T. Accordingly, the turnover T has only a simple rocking motion for inverting and transferring the doughnuts from A to X when sufficiently cooked underneath; and the ejector E which receives them at X has likewise a simple rocking motion for throwing the doughnut up and over the end of the cooking range and of the receptacle V when fully cooked,—as shown in Fig. XV. The former F may be located high enough to be cleared by the upswinging turnover T (and the doughnut D thereon), as shown in full lines in Fig. XV; or provsion may be made for shifting the former F out of the way of the turnover T when the latter is operated, and returning the former F close over the cooking liquor to drop each doughnut,—thus avoiding any possible deformation of doughnuts by dropping too far. In the present instance, provision is made for shifting the former F vertically to clear the turnover T, as hereinafter explained, rather than horizontally,—which, however, would of course answer the same purpose.

Here the first or doughnut-receiving cell virtually consists of the turnover cellule T, with the left-hand end of receptacle V and frame G defining its boundary at the left; while the second or doughnut-ejection cell virtually consists of the ejector cellule E.

In the machine of Fig. XV, the hands 200 and 201 of turnover T and ejector E are substantially like the hand 174 of Figs. XI and XIV, except that hand 200 lacks the lip or flange P' and the stop-and-runner 175. The hands 200 and 201 are operated by a common cam groove 202 in the far side of a cam member 203 fast on the shaft 82, through connections substantially similar to those shown in Figs. I-VII for operating hands 74 and 88; and these connections are marked with the same reference characters as in Figs. I–VII, as a means of dispensing with repetitive description. However, in Fig. XV the actuating rock arms 78 and 92 for hands 200 and 201 are at the far or rear side of receptacle V, instead of in front of it as in Figs. I–VII.

Except as otherwise indicated, the former F shown in Fig. XV is substantially like that shown in Figs. I–XI, so that various parts and features thereof are indicated by the same reference characters as used in Fig. I, etc. However, provision is made for moving this former F bodily up and down between its full line upper position and a lower position corresponding to the dot-and-dash position of its disc 54, so as to allow the upswing of turnover T to clear former F. For this purpose the former F is mounted on a bracket 205 fixed to a vertically reciprocating rod 206 whose squared intermediate portion 207 can slide in a corresponding opening of a fixed guide block 208 at the receiving end of the receptacle V. For reciprocating the rod 206, there is a cam groove 209 in the front side of the cam member 203. In this groove 209 engages a roller 210 on a lever arm 211 which has a fixed fulcrum at 212, and has in its free end a slot or clevis 13 wherein engages a pin 214 on the lower end of the rod 206. For operating the cutter 53 on the dough hopper neck 52, the bodily up and down motion of the former F may be utilized, and the cam 71, etc., of Figs. I—VIII dispensed with. As shown, the lever 64 of Fig. I is replaced by a short forked arm 215 fulcrumed on a lug 216 depending from the bracket 205 and having pins 217 on its forked end engaged in the cutter sleeve groove 218, at either side of the sleeve. A helical compression spring 220 is interposed between the upper end of the cutter sleeve 53 and the bracket 205, to keep the cutter sleeve normally depressed around the disk 54. From the arm 215, a lug 221 projects forward, in position to engage an upstanding stop pin 222 on the horizontal flange of the frame G at its front side.

As shown, the guide 208 has a set-screw 223 which may be tightened on the rod 206 to hold the former F fixed in the full line position shown. When this is done, lever arm 211 may be shifted forward along its fulcrum shaft 212 to free its clevis 213 from pin 214 and its roller 210 from cam groove 209, and even removed altogether.

As in Figs. I–XI and XII–XIV, each revolution of the shaft 82 corresponds to one complete cycle of operations. With the shaft 82 revolving clockwise from the position shown in Fig. XV, the first occurrence will be the return of the ejector E to its normal submerged horizontal position, by the cam groove 202. Next the rise of cam groove 202 will operate turnover T to throw the partly cooked doughnut at A over (inverted) into station X, over ejector E, and return it. The parts being connected as shown in full lines in Fix. XV, and the set-screw 223 loose, the depression in the cam-groove 209 will next lower and raise the former F rather slowly; and during the lower portion of this reciprocation, the cutter sleeve 53 will be operated by the stop 272 to cause a raw doughnut D to be formed as shown in dot-and-dash lines, and deposited at station A over the turnover T, as shown in full lines. Finally, the cam groove 202 will operate ejector E to eject the doughnut thus inverted and transferred, as shown in full lines in Fig. XV. A revolution of shaft 82 being thus completed, the cycle of operations will be forthwith repeated. When set-screw 223 is tightened to fasten former F in full line position, and lever arm 211 disconnected as above described, the cutter sleeve 53 may be operated in proper relation to turnover T and ejector E in any suitable way, as by the means disclosed in connection with Figs. I–XI.

Having thus described my invention, I claim:

1. In a doughnut machine, the combination of a receptacle for hot cooking liquor, and a doughnut former and cutter for dropping raw doughnuts horizontal into the cooking liquor, with means for confining, manipulating, and transferring the doughnuts, including a cooking cell receiving each doughnut as it drops and confining it for a period of cooking on one side, in one and the same position substantially throughout cooking on said side, and comprising turnover means for engaging the doughnut at said position and inverting it; a second cooking cell receiving each inverted doughnut from the first cell and confining it for a period of cooking on the other side, in one and the same position substantially throughout cooking on this latter side, and comprising ejector means for engaging each doughnut at said position and ejecting it; and means for actuating said doughnut forming and cutting and manipulating and transferring means, including said turnover and ejector, in timed sequence.

2. In a doughnut machine, the combination of a receptacle for hot cooking liquor, and a doughnut former and cutter for dropping raw doughnuts horizontal into the cooking liquor, with a cooking cell receiving the doughnuts as they drop and confining them in two positions directly adjacent one another during a period of cooking on one side, said cooking cell comprising both pusher means for shifting each doughnut from the position under the cutter to the adjacent position, and turnover means for engaging the doughnut at the latter position and inverting it; a second cooking cell receiving and confining the inverted doughnuts during a period of cooking on the other side, and comprising an ejector for ejecting each doughnut; and means for actuating said doughnut former and cutter and said shifting, inverting, and ejecting means in timed sequence.

3. In a doughnut machine, the combination of a receptacle for hot cooking liquor; and a doughnut former and cutter for dropping raw doughnuts horizontal into the cooking liquor, with a cooking cell receiving the doughnuts as they drop and confining them in two positions directly adjacent one another during a period of cooking on one side, said cooking cell comprising both means for shifting each doughnut from the position under the cutter to the adjacent position, and means for engaging the doughnut at the latter position and inverting it; a second cooking cell receiving the inverted doughnuts and confining them in two positions directly adjacent one another during a period of cooking on the other side, said second cell comprising both means for shifting each doughnut from the position where it is received in the cell to the adjacent position, and ejector means for engaging each doughnut at the latter position and ejecting it; and means for actuating said doughnut former and cutter and said shifting, inverting, and ejecting means in timed sequence.

4. A doughnut machine comprising a receptacle for hot cooking liquor having a fixed, confined cooking range or channel affording space for several doughnuts only; means for dropping raw doughnuts horizontal into the cooking liquor in one end of said cooking range; a single cooking and inverting cellule in said end of the cooking range for successively receiving the doughnuts as they drop, shifting each doughnut toward the other end of the cooking range, and inverting and transferring it thereinto after a cooking interval; a single cooking and ejecting cellule in said latter end of the cooking range for successively receiving the partly cooked doughnuts when thus transferred, and ejecting each after a further cooking interval; and means for actuating said doughnut dropping means, said cooking and inverting cellule, and said cooking and ejecting cellule to drop, shift, invert and transfer and eject the doughnuts in sequence.

5. A doughnut machine comprising a receptacle for hot cooking liquor having a fixed, confined cooking range or channel affording space for several doughnuts only; means for dropping raw doughnuts horizontal into the cooking liquor at one end of said cooking range; a cooking and ejecting cellule stationed in substantially fixed position at the other end of said range, comprising a barrier confining successive doughnuts in such fixed position for cooking, as well as a movable ejector; a cooking and inverting cellule stationed in substantially fixed intermediate position in said cooking range, comprising a barrier for confining successive doughnuts in such fixed position, as well as a movable turnover for inverting each doughnut and transferring it to a position between said cellules; means for advancing each doughnut dropped into the liquor into said inverting cellule, and for advancing into said ejecting cellule each doughnut transferred from the inverting cellule as aforesaid; and means for actuating the doughnut-dropping means, the first advancing means, the turnover, the second advancing means, and the ejector to drop, advance, invert, advance, and eject doughnuts in sequence.

6. In a doughnut machine, the combination with a receptacle for hot cooking liquor, and means for dropping raw doughnuts horizontal into the cooking liquor in said receptacle; pusher and turnover means for receiving each doughnut between them directly under said dropping means and there confining it till sufficiently buoyant to float; means for actuating said pusher means to shift the doughnut over said turnover means, and for thereafter actuating said turnover means to throw the doughnut over further in the same direction in inverted position after a cooking interval; pusher and ejector means for receiving the doughnut when thus inverted; and means for actuating said pusher means to shift the doughnut still further in said direction over said ejector means, and for thereafter actuating said ejector means to throw the doughnut up and yet further in said direction out of the receptacle.

7. In a doughnut machine, the combination with a receptacle for hot cooking liquor, and means for dropping raw doughnuts horizontal into the cooking liquor in said receptacle; of a confining and inverting device for receiving each doughnut directly under said dropping means, as it drops, confining it there during a cooking interval, and then inverting and transferring it from under said dropping means; a confining and ejecting device for receiving the doughnut where thus transferred, holding it there during a further cooking interval; and means for actuating said doughnut dropping means, said confining and inverting device, and said confining and ejecting device to drop, invert and transfer, and eject doughnuts in sequence as hereinbefore set forth.

8. In a doughnut machine, the combination with a receptacle for hot cooking liquor, and means for dropping raw doughnuts horizontal into the cooking liquor in said receptacle; of a confining and inverting device for receiving each doughnut directly under said dropping means, and inverting and transferring it from under said dropping means after a cooking interval; a confining and ejecting device for receiving the doughnut where thus transferred, holding it there during a further cooking interval, and then ejecting it in the same direction; and means for actuating said doughnut dropping means, said confining and inverting device, and said confining and ejecting device to drop, invert and transfer, and eject doughnuts in sequence as hereinbefore set forth.

9. In a doughnut machine, the combination with a receptacle for hot cooking liquor, and means for dropping raw doughnuts horizontal into the cooking liquor in said receptacle; of a reciprocating and oscillating confining and turnover device for receiving each doughnut directly under said dropping means, as it drops, shifting it directly from under said dropping means, throwing it over in the same direction, after a cooking interval; and returning back to receive the next doughnut; an oscillatory confining and ejecting device for receiving the doughnut where thus transferred, holding it there during a further cooking interval, and then throwing it up and out of the cooking liquor; and means for actuating said doughnut dropping means, said confining and turnover device, and said confining and ejecting device to drop doughnuts, shift them to one side, and throw them up and to one side in sequence as hereinbefore set forth.

10. A doughnut machine comprising a receptacle for hot cooking liquor having a fixed, confined cooking range affording space for two doughnuts only; means for dropping raw doughnuts horizontal into the cooking liquor in one end of the cooking range; a cooking and inverting cell in said end of the cooking range for receiving each doughnut as it drops, and inverting and transferring it to the other end of the cooking range after a cooking interval; a cooking and ejecting cell in the latter end of the cooking range for receiving each doughnut when thus transferred, and ejecting it when fully cooked; and means for actuating said doughnut dropping means, said cooking and inverting cell and said cooking and ejecting cell to drop, invert and transfer, and eject doughnuts in sequence as hereinbefore set forth.

11. A doughnut machine comprising an oblong receptacle or trough for hot cooking liquor and a forming device for dropping raw doughnuts horizontal thereinto, and two confining cells in sequence lengthwise of the receptacle, one of said cells adapted to receive individual doughnuts from the forming means and to cook them on one side, this cell comprising turnover means; and the other cell adapted to directly receive the doughnuts individually, after inversion by the turnover cell, for cooking of their other sides, the latter cell comprising ejector means for ejecting the doughnuts individually after the second cooking period; and means for actuating said forming means, said turnover means of the first-mentioned cell, and said ejector means of the other cell to drop, invert, and eject the doughnuts in sequence as hereinbefore set forth.

12. In a doughnut machine, the combination with a receptacle for hot cooking liquor, of means located close above the cooking liquor for dropping raw doughnuts horizontal into the liquor, and doughnut-manipulating means having a movement above the cooking liquor adjacent said dropping means, and also moving under said dropping means to bring each doughnut dropped out from under the dropping means, and means for actuating said doughnut dropping means and said manipulating means in timed sequence.

13. In a doughnut machine, the combination with a receptacle for hot cooking liquor, and means for dropping raw doughnuts horizontal into the cooking liquor in said receptacle at one end; of a reciprocating and oscillating confining and turnover device for receiving each doughnut directly under said dropping means, as it drops, shifting it directly from under said dropping means, throwing it over in the same direction, after a cooking period, and returning back to receive the next doughnut.

14. In a doughnut machine, the combination with a receptacle for hot cooking liquor, of means located close above the cooking liquor for dropping raw doughnuts horizontal into the liquor, doughnut-manipulating means having a movement above the cooking liquor adjacent said dropping means, a reciprocating pusher for engaging each raw doughnut and pushing it directly from under said dropping means into the path of said manipulating means, and means for actuating said doughnut dropping means, manipulating means, and pusher in timed sequence.

15. A doughnut machine comprising an elongated receptacle for hot cooking liquor, means for dropping raw doughnuts horizontal into the cooking liquor in one end of the receptacle, discharge means for the cooked doughnuts at the opposite end of the receptacle, means for intermediately inverting the doughnuts and for delivering them to the discharge means, and reciprocating pusher means for engaging each raw doughnut and pushing it from under said dropping means and toward said inverting means.

16. In a machine for cooking articles such as doughnuts in hot liquor, the combination of an elongated receptacle for the cooking liquor into which the raw articles are successively introduced at one end, means at an intermediate point in the receptacle for individually inverting the articles, separate alternately reciprocating means for individually advancing the raw doughnuts from the receiving end of the receptacle to said inverting means and from the latter to the other end of the receptacle, means operating in the latter end of the receptacle for individually receiving the articles from the corresponding advancing means and ejecting them, and means for actuating the first advancing means, the inverting means, the second advancing means, and the ejecting means in timed sequence.

17. In a machine for cooking articles such as doughnuts in hot liquor, a receptacle for the cooking liquor into which the raw articles are successively introduced; means for individually turning the articles over during the cooking; means for individually ejecting the articles upon completion of the cooking; separate means for individually advancing the articles from the region of their introduction into the receptacle to the turnover means, and for individually advancing the turned doughnuts to the ejecting means; and mechanism for actuating said inverting, said first advancing, said ejecting, and said second advancing means in the order named to predetermine a cooking cycle in which a raw doughnut is introduced into the receptacle, a partially cooked doughnut next turned over, the newly introduced doughnut next advanced to the turnover means, a cooked doughnut next ejected from the machine, and the turned doughnut next advanced to the ejecting means.

18. In a machine for cooking articles such as doughnuts in hot liquor, an elongate receptacle for the cooking liquor into one end of which the raw articles are successively introduced; means at an intermediate point in the receptacle including a normally submerged pivoted hand for lifting the articles from the cooking liquor and transferring them inverted to a clear space beyond in the receptacle; intermittent means at the opposite end of the receptacle likewise including a normally submerged pivoted hand for successively lifting the cooked articles from the liquor and ejecting them from the machine; separate intermittent means for advancing the raw doughnuts individually from the receiving end of the receptacle over the submerged turnover hand, and for advancing the turned doughnuts individually from the clear space aforesaid to float over the submerged ejecting hand; and mechanism for successively actuating the several means aforesaid.

19. In a machine for cooking articles such as doughnuts in hot liquor, a receptacle for the cooking liquor into which the raw articles are successively introduced; separate pivoted hands for respectively turning the articles over individually during the cooking and for ejecting them individually from the machine after the cooking; separate means for individually advancing the articles from beneath the forming means to the turnover means and the turned doughnuts to the ejecting means; and mechanism for actuating the turnover and ejector hands in alternation, and for actuating the separate advancing means in alternation with each other and with said turnover and ejecting means.

20. In a machine for cooking articles such as doughnuts in hot liquor, a receptacle for the cooking liquor into which the raw articles are successively introduced; means comprising separate pivoted hands for respectively turning the articles over individually during the cooking and ejecting them individually from the machine upon completion of the cooking; separate means for respectively advancing the articles individually from the region of their introduction into the receptacle to the turnover means, and the turned articles individually to the ejector means; and mechanism for actuating the turnover and the ejector means in alternation with each other and with the turnover and ejecting means, including separate rocker arms for the respective advancing means, a single rotary cam for operating both said rocker arms, cranks on the shafts of the turnover and ejector hands, separate rocker arms to operate the cranks, a single rotary cam to operate both the last mentioned rocker arms, and connections for rotating the two rotary cams in unison.

21. In a machine for cooking articles such as doughnuts in hot cooking liquor, an elongate receptacle for the cooking liquor into which the raw articles are successively introduced; means at an intermediate point in the receptacle for individually turning the articles over; means at the opposite end of the receptacle for individually ejecting the articles from the machine upon completion of the cooking; separately acting means for individually advancing the articles from the region of their introduction into the receptacle to the turnover means, and for individually advancing the turned articles to the ejecting means; and barrier means with the turnover and ejecting means, respectively, for preventing doughnuts from accidentally floating into the range of said turnover and ejecting means during their action.

22. In a machine for cooking articles such as doughnuts in hot liquor, a receptacle for the cooking liquor; means for advancing the articles individually while afloat on one side in the liquor; turnover means including a normally submerged pivoted hand for turning the articles individually advanced thereover by the advancing means so as to float on their other sides in the liquor during further cooking; an associated downwardly yielding arresting means normally held submerged in the liquor by the turnover hand but adapted to rise automatically incident to the swinging of said turnover hand to intercept and thus prevent other articles from accidentally floating into the range of the turnover means; and means for actuating said advancing means to advance an article over said turnover means when the same is submerged, and for actuating said turnover means to turn over the article thus advanced by said advancing means.

23. In a machine for cooking articles such as doughnuts in hot liquor, a receptacle for the cooking liquor; means for advancing the articles individually while afloat on one side in the liquor; turnover means including a normally submerged pivoted hand for turning the articles individually advanced thereover by the advancing means so as to float on their other sides in the liquor during further cooking; an associated upwardly spring pressed pivoted arresting means normally held submerged by the turnover hand but lifted automatically by its spring incident to swinging of the hand to intercept and thus prevent other articles from floating accidentally into the range of the turnover; and means for actuating said advancing means to advance an article over said turnover means when the same is submerged, and for actuating said turnover means to turn over the article thus advanced by said advancing means.

24. In a machine for cooking articles such as doughnuts in hot liquor, a receptacle for the cooking liquor; means for advancing the articles individually while afloat on one side in the liquor; turnover means including a normally submerged pivoted hand with an upstanding retaining flange along its swinging edge ordinarily projecting above the surface of the liquor; and means for first lowering said hand into the liquor so that an article may be advanced over the flange on to the hand, then actuating said advancing means to advance an article over said hand, and thereafter swinging said hand upward to turn the article up and over to float on its other side in the liquor.

25. In a machine for cooking articles such as doughnuts in hot liquor, a receptacle for the cooking liquor; means for advancing the articles while afloat on one side in the liquor, turnover means including a normally submerged pivoted hand with an upstanding retaining flange along its free edge ordinarily projecting above the surface of the liquor; an associated upwardly spring pressed auxiliary arresting means normally held submerged in the liquor by the hand; and actuating means whereby the turnover hand is first lowered in the liquor so that an article may be advanced thereover and later swung upward to turn the article over for flotation on its other side during further cooking, with attendant rise of the auxiliary arresting means under the influence of its spring to intercept and thus prevent another article from floating accidentally into the range of the turnover means, and for actuating said advancing means to advance an article over said turnover means while the latter is lowered as aforesaid.

26. In a machine for cooking articles such as doughnuts in hot liquor, a receptacle for the cooking liquor; means for advancing the articles while afloat on one side in the liquor; turnover means including a normally submerged pivoted hand with an upstanding retaining flange along its free edge ordinarily projecting above the surface of the liquor; actuating means including a crank on the shaft of the turnover hand, a rocker arm to operate the crank, and a rotary cam with a rise and a depression whereby the hand is first lowered in the liquor so that an article may be advanced thereover by the advancing means, and later swung upward to turn the article over for flotation on its other side in the liquor during further cooking; and means for actuating said advancing means to advance an article over said turnover means while the latter is lowered as aforesaid.

27. In a machine for cooking articles such as doughnuts in hot liquor, a receptacle for the cooking liquor; a horizontally-reciprocative blade for individually advancing the articles while afloat on one side in the liquor; turnover means including a normally submerged pivoted hand for lifting the articles individually advanced thereover by the advancing blade and turning them over for flotation on their other sides in the liquor during further cooking; and mechanism for actuating the advancing blade and the turnover means in alternation including a rocker arm for the advancing blade, a rotary cam for actuating the rocker arm, a crank for the turnover hand, a rocker arm for operating the crank, and a separate rotary cam to operate the last mentioned rocker arm, and means for driving the cams in unison.

28. In a machine for cooking articles such as doughnuts in hot liquor, a receptacle for the cooking liquor; means for individually advancing raw articles successively introduced into the receptacle; means for ejecting the articles from the machine after the completion of the cooking including a normally submerged pivoted hand for lifting the articles individually advanced thereover by the advancing means aforesaid and discharging them over the edge of the receptacle onto a delivery chute; and an associated downwardly yielding arresting means normally held submerged by the hand but capable of rising automatically during the actuation of the hand to prevent other articles from floating accidentally into the range of the ejector means.

29. In a machine for cooking articles such as doughnuts in hot liquor, a receptacle for the cooking liquor into which the raw articles are successively introduced; means including a pivoted hand for individually turning the articles over incident to cooking; means likewise including a pivoted hand for individually ejecting the articles from the machine after the completion of the cooking; and means for actuating the turnover and ejector hands in alternation including a rotary cam with a single rise, a pair of rocker arms with rollers engaging the cam at diametrically opposite points, and cranks on the shafts of said turnover and ejector hands respectively operated by the rocker arms.

30. In a machine for cooking articles such as doughnuts in hot liquor, an elongate receptacle for the cooking liquor into one end of which the raw articles are introduced; means at an intermediate point in the receptacle for individually turning the articles over; means at the opposite end of the receptacle for individually ejecting the articles from the machine at the completion of the cooking; separate means for individually advancing the articles from the receiving end of the receptacle to the turning means and for individually advancing the turned articles to the ejecting means; and means for actuating the separate advancing means contrariwise and in alternation including a rotary cam with a single rise, a pair of reciprocating members with rollers engaging the cam at diametrically opposite points, and rocker arms respectively connected to the separate progressing means and influenced respectively by the reciprocating members.

HERBERT T. HUNTER.